US012673520B2

(12) United States Patent
Orambot

(10) Patent No.: US 12,673,520 B2
(45) Date of Patent: Jul. 7, 2026

(54) HEAVY-DUTY VEHICLE TIRE TREAD WITH IMPROVED ROBUSTNESS

(71) Applicant: COMPAGNIE GENERALE DES ETABLISSEMENTS MICHELIN, Clermont-Ferrand (FR)

(72) Inventor: Clément Orambot, Clermont-Ferrand Cedex (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 77 days.

(21) Appl. No.: 18/033,751

(22) PCT Filed: Oct. 22, 2021

(86) PCT No.: PCT/FR2021/051853
§ 371 (c)(1),
(2) Date: Apr. 25, 2023

(87) PCT Pub. No.: WO2022/090651
PCT Pub. Date: May 5, 2022

(65) Prior Publication Data
US 2023/0398815 A1    Dec. 14, 2023

(30) Foreign Application Priority Data

Oct. 26, 2020    (FR) .................................. FR2010963

(51) Int. Cl.
*B60C 11/03*        (2006.01)
*B60C 11/12*        (2006.01)
(52) U.S. Cl.
CPC ...... *B60C 11/0323* (2013.01); *B60C 11/1236* (2013.01); *B60C 11/1259* (2013.01); *B60C 2011/1245* (2013.01); *B60C 2200/06* (2013.01)

(58) Field of Classification Search
CPC ............. B60C 11/1281; B60C 2200/06; B60C 2200/065; B60C 11/12; B60C 11/0323
See application file for complete search history.

(56) References Cited

U.S. PATENT DOCUMENTS

| | | | | |
|---|---|---|---|---|
| 4,884,606 A | * | 12/1989 | Matsuda | ................. B60C 11/12 |
| | | | | 152/DIG. 3 |
| 2016/0075185 A1 | * | 3/2016 | Akashi | .................. B60C 11/032 |
| | | | | 152/209.17 |

FOREIGN PATENT DOCUMENTS

| | | |
|---|---|---|
| FR | 3089864 | 6/2020 |
| JP | 2010260403 A | * 11/2010 |

(Continued)

OTHER PUBLICATIONS

WO 2020-058622 Machine Translation; Belarbi, Houria (Year: 2020).*

(Continued)

*Primary Examiner* — Justin R Fischer
*Assistant Examiner* — Nicholas J Weiler
(74) *Attorney, Agent, or Firm* — COZEN O'CONNOR

(57)                    ABSTRACT

A heavy-duty vehicle tire tread to improve resistance to chunking of the oblique sipes opening into the external cavities thereof and having at least one substantially longitudinal cut (3) with at least one external cavity (6) open onto the tread surface (2) along an open section (7) having a closed contour (8). Each cavity (6) is connected to two substantially longitudinal sipes (91) and to an oblique sipe (92) having a mean plot (M2) intersecting the contour (8) at a connection point (I). The mean plot (M2) forms an angle (A1, A2) strictly greater than 90° with at at least two straight lines (T1, T2) tangential to the contour (8) respectively at two points (I1, I2) of the contour (8) that are positioned on either side of the mean plot (M2) and at a curvilinear (Continued)

distance (d1, d2) from the connection point (1) at most equal to 2 mm.

14 Claims, 3 Drawing Sheets

(56)                    References Cited

FOREIGN PATENT DOCUMENTS

| WO | WO 2011/039194 | 4/2011 |
| WO | WO 2011/101495 | 8/2011 |
| WO | WO 2012/130735 | 10/2012 |
| WO | WO 2014/040958 | 3/2014 |
| WO | WO 2019/229371 | 12/2019 |
| WO | WO 2020/030667 | 2/2020 |
| WO | WO 2020/058622 | 3/2020 |

OTHER PUBLICATIONS

JP 2010-260403 Machine Translation; Fujiwara, Osamu (Year: 2010).*

* cited by examiner

I - I

II - II

HEAVY-DUTY VEHICLE TIRE TREAD WITH IMPROVED ROBUSTNESS

RELATED APPLICATIONS

This is a U.S. National Phase Application under 35 USC 371 of International Application PCT/FR2021/051853 filed on Oct. 22, 2021.

This application claims the priority of French application no. FR 2010963 filed Oct. 26, 2020, the entire content of all of which is hereby incorporated by reference.

FIELD OF THE INVENTION

The invention relates to a tire tread for a heavy-duty vehicle intended to be driven on tarmacked roadways.

BACKGROUND OF THE INVENTION

A tread, situated at the periphery of the tire and intended to wear down when it comes into contact with the ground via a tread surface, is made up of at least one rubber-based material. It also comprises a tread pattern, which is a combination of cuts, or voids, and raised elements and is intended to ensure a satisfactory performance in terms of grip, more particularly on a wet roadway.

A tread may be defined geometrically by three dimensions: a smallest dimension along a radial direction, or thickness, an intermediate dimension along a transverse direction, or width, and a greatest dimensions along a longitudinal direction, or length. By convention, the thickness is the distance, measured along a radial direction, between the tread surface and a bottom surface, defined as being a surface parallel to the tread surface and tangential to the deepest cut. The width is the distance between the transverse ends of the tread surface. The length is equal to the outer circumference of the tire.

A tread is often characterized by a volumetric void ratio, defined as the ratio between the volume of voids and the total volume of the tread, this total volume being measured between the tread surface and the bottom surface without taking the voids into account. For heavy-duty vehicle tires of the prior art, the volumetric void ratio is generally between 10% and 25%, for a tire in the new state, before it is driven on.

As is known, the wet-weather running conditions of a vehicle, and more particularly those of a heavy-duty vehicle, require rapid evacuation of the water present in the contact patch between the tread of the tire and the roadway. This evacuation makes it possible to ensure direct contact between the material of which the tread is made and this roadway via the tread surface. The water that is not pushed ahead of or to the sides of the tire flows or is collected partially in the cuts formed in the tread.

The evacuation of the water is ensured by the cuts, which form a fluid flow network which preferably needs to be durable, that is to say effective through the service life of the tire between its new state and its state of maximum wear. The state of maximum wear, which is set by the regulations in force, is the state beyond which the tire needs to be removed from the tire for safety reasons.

The tires for heavy-duty vehicles generally have an available void volume in the contact patch which is relatively high in the new state. The available void volume is understood to be a void volume that is able to be filled with the water present on the roadway. The volume of voids opening onto the tread surface is evaluated when the tire is subjected to recommended inflation and load conditions as are defined in particular by the European standards of the "European Tire and Rim Technical Organization" or "E.T.R.T.O." in its "Standards Manual 2020—Commercial Vehicle Tires".

Among the cuts, a distinction is made between sipes and grooves. The sipes have a width such that the facing walls of material that delimit them come into contact with one another at least partially when the tread enters the contact patch, under the tire load and pressure conditions specified by the ETRTO: thereby limiting the deformations of the facing portions of material and therefore wear. By contrast, the grooves, which are wider than the sipes, delimit portions of material that can deform without coming into contact with one another when the tread enters the contact patch. These deformations of the portions of material, in compression and in shear, contribute to an increase in the wearing of the tread. Moreover, when grooves are present, an increase in the deformations generates an increase in hysteresis losses of the tread, and therefore the rolling resistance and, consequently, greater fuel consumption.

To limit the reduction in the volume of material of the tread that results from the presence of grooves, so-called complex cuts have been proposed, which make it possible, compared with normal cuts, which are completely open onto the tread surface, to increase the volume of material of the tread while complying with the void volume for storage of water above a given threshold, regardless of the level of wear of the tire.

Treads comprising such complex cuts have been described in particular in the documents WO 2011039194, WO 2011101495 and WO 2012130735. A complex cut opens onto the tread surface in a discontinuous manner, at a regular or irregular spacing, when new. Each complex cut has external cavities that are open onto the tread surface and are separated from one another in the main direction of the complex cut. The main direction of the complex cut corresponds to the direction in which water flows in said cut when running on ground covered in water. This complex cut comprises, besides the external cavities, internal cavities formed inside the tread and generally connected to the tread surface by sipes. These internal cavities are positioned radially and entirely on the inside of the tread surface in the new state, and are interposed between the external cavities. The internal cavities may be positioned at different depth levels in the thickness of the tread. Moreover, the continuity of the flow of water, or more generally of fluid, in each complex cut in the new state is ensured by the connection between the respectively external and internal cavities. The connections between the internal and external cavities thus form a continuous groove, independently of the local orientation of the internal or external cavities. By contrast, the juxtaposition of internal and external cavities that are not connected together and therefore do not allow fluid to flow from one to the other around the entire circumference of the tire does not constitute a continuous groove.

For a tread having complex cuts, the volume of all of the cavities, internal and external, is reduced compared with that of grooves that are completely open onto the tread surface when new and have a depth corresponding to the maximum depth of the internal or external cavities. The presence of complex cuts thus makes it possible to limit the reduction in stiffness of the tread in the new state that is associated with the presence of the grooves.

A tread pattern may have both complex cuts, open intermittently onto the tread surface, and conventional grooves that open onto the tread surface along their entire length.

However, it has been found that the mere presence of complex cuts did not make it possible to achieve the level of grip under traction and under braking that is required on certain heavy-duty vehicles and that it was sensible to combine these complex cuts with oblique sipes, that is to say sipes inclined with respect to the main direction of the grooves, opening onto the tread surface in the new state. These oblique sipes generate, in the tread surface, an additional length of edge corners, making it possible to achieve a good level of traction and satisfactory grip under so-called "slippery" conditions, in particular on ground covered in water.

The oblique sipes opening into the external cavities of the complex cuts are often sensible to chunking, however. By way of example, this chunking may arise on the treads of tires fitted to load-bearing truck axles, which are frequently subjected to transverse scrubbing stress.

SUMMARY OF THE INVENTION

Thus, the inventors set themselves an objective of improving the resistance to chunking of the oblique sipes opening into external cavities of heavy-duty vehicle tire treads, in particular into those of complex cuts.

This objective has been achieved by a heavy-duty vehicle tire tread intended to come into contact with the ground via a tread surface, comprising cuts delimiting raised elements, and having a thickness, along a radial direction, between the tread surface and a bottom surface, the tread comprising at least one substantially longitudinal cut having, on the tread surface, a mean plot, the tangent of which at any point forms an angle at most equal to 45° with a longitudinal direction of the tread, the at least one substantially longitudinal cut comprising at least one external cavity open onto the tread surface along an open section having a closed contour, each external cavity being connected to two substantially longitudinal sipes, extending along the mean plot of the substantially longitudinal cut and intersecting the contour at two connection points, the open section of each external cavity having a length, measured along a first straight line passing through the two connection points, and a width at most equal to the length and measured along a second straight line perpendicular to the first straight line, at least one oblique sipe opening into each external cavity and having, on the tread surface, a mean plot that is not parallel to the first straight line and intersects the contour at a connection point, the mean plot of each oblique sipe forming an angle strictly greater than 90° with at at least two straight lines tangential to the contour respectively at two points of the contour that are positioned on either side of the mean plot of the oblique sipe and at a curvilinear distance from the connection point at most equal to 2 mm.

The heavy-duty vehicle tire tread intended to come into contact with the ground via a tread surface comprises cuts delimiting raised elements, and extends between the tread surface and a bottom surface, In the context of the invention, the tread surface is considered in the new state of the tire before it is used for running. The bottom surface is a surface parallel to the tread surface and tangential to the bottom of the deepest cut. The distance between the tread surface and the bottom surface defines the thickness of the tread in the new state of the tire, that is to say the thickness of material to be worn down.

The tread comprises at least one substantially longitudinal cut having a mean plot, the tangent of which at any point forms an angle at most equal to 45° with a longitudinal direction of the tread. The mean plot of a cut is the name given to the intersection between a mean surface of the cut perpendicular to the tread surface and the tread surface. A substantially longitudinal direction forms an angle of between 0° and 45° A zero angle defines a strictly longitudinal direction. Above 45°, the direction is said to be substantially transverse. By way of examples, a substantially longitudinal cut may have a rectilinear, zigzag or wavy mean plot.

At least one substantially longitudinal cut comprises at least one external cavity open onto the tread surface along an open section having a closed contour. An external cavity is understood to be all or part of a cut that is open onto the tread surface of the tire along an open section in the new state of the tire. The open section has a closed contour, possibly with at least one local discontinuity corresponding to the connection to a sipe.

Each external cavity is connected to two substantially longitudinal sipes, extending along the mean plot of the substantially longitudinal cut and intersecting the contour at two connection points. In other words, a substantially longitudinal sipe has a mean plot coincident with that of the substantially longitudinal cut. Usually, a substantially longitudinal sipe connects two consecutive external cavities of the same substantially longitudinal cut. A connection point is a point at which the substantially longitudinal sipe opens into the external cavity.

The open section of each external cavity has a length, measured along a first straight line passing through the two connection points, and a width at most equal to the length and measured along a second straight line perpendicular to the first straight line. This length and this width are measured on the tread surface of the tire in the new state. In other words, an open section of the external cavity is generally inscribed in an envelope rectangle having a long side defining the length and a short side defining the width. However, in one particular embodiment, the length and the width may be equal, meaning that the envelope rectangle of the open section is then a square.

At least one oblique sipe opens into each external cavity and has, on the tread surface, a mean plot that is not parallel to the first straight line and intersects the contour at a connection point. By definition, an oblique sipe is not parallel to a substantially longitudinal sipe.

An essential feature of the invention is that the mean plot of each oblique sipe forms an angle strictly greater than 90° with at at least two straight lines tangential to the contour respectively at two points of the contour that are positioned on either side of the mean plot of the oblique sipe and at a curvilinear distance from the connection point at most equal to 2 mm.

According to the invention, the orientation of any oblique sipe opening into an external cavity, and therefore its mean plot in the tread surface, is optimized in order to minimize the risk of chunking of this oblique sipe while the tire is running. This optimization consists in having an angle greater than 90° between the mean plot of the oblique sipe and at least two tangents to the contour respectively at two points of the contour, which are positioned on either side of the mean plot of the sipe and situated in the vicinity of the connection point of the contour at which the incision opens out. These points of tangency are positioned on either side of the connection point, in a range of curvilinear distances at most equal to 2 mm, these curvilinear distances being measured on the contour from the connection point. Such an obtuse angle means that the portions of material contained between the oblique sipe and the external cavity are relatively solid, and therefore less deformable, thereby reducing the risk of crack initiation at the oblique sipe. However, there may be at least one point of the contour where the tangent to the contour forms, with the mean plot of the oblique sipe, an angle less than 90°, that is to say an acute angle, and this may possible bring about local chunking of the tread. Such chunking that is very localized and, a priori, small in size remains admissible in the scope of the invention.

Preferably, the mean plot of each oblique sipe forms an angle strictly greater than 90° with any straight line tangential to the contour at any point on the contour that is positioned at a curvilinear distance from the connection point at most equal to 2 mm. In this preferred embodiment, no tangent to the contour at a point in the vicinity of the connection point can form an acute angle, meaning that the inventors are aiming, in this embodiment, for a complete lack of chunking of the tread, even very localized and small in size.

Advantageously, the width of the open section of each external cavity is at least equal to 4 mm Consequently, the length of the open section of each external cavity is likewise at least equal to 4 mm Below 4 mm, the water storage capacity of the external cavity, when running over wet ground, is insufficient to ensure sufficient grip of the tire.

Also advantageously, the width of the open section of each external cavity is at most equal to 17 mm Above 17 mm, the probability of the occurrence of uneven patterns of wear on the contour of the external cavity becomes high.

Advantageously, the length of the open section of each external cavity is at most equal to 10 times the width of said open section. Above this value, the open section, the surface area of which becomes high, contributes to a significant reduction in the stiffness of the tread, and this may have a negative effect on wear and rolling resistance.

Advantageously, each external cavity has a depth, measured between the tread surface and a cavity bottom, at least equal to 0.25 times the thickness of the tread. The depth of the external cavity is the distance measured between the open section and the bottom of the external cavity, more specifically between the deepest point of the external cavity and the orthogonal projection thereof onto the tread surface. The thickness of the tread is the distance measured between the tread surface and the bottom surface, parallel to the tread surface and tangential to the bottom of the deepest cut, more specifically between the point of tangency of the bottom surface with the bottom of the deepest cut and the projection thereof onto the tread surface. Below 0.25 times the thickness of the tread, the depth of the external cavity is insufficient to ensure a water storage capacity of the external cavity, when running on wet ground, that is sufficient with regard to suitable grip of the tire.

Also advantageously, each external cavity has a depth, measured between the tread surface and a cavity bottom, at most equal to the thickness of the tread. Above this value, the depth of the external cavity brings about a reduction in the thickness of the rubber-based layer interposed between the bottom surface and the crown reinforcement of the tire, and increases the risk of mechanical attack of the crown reinforcement by external objects.

Advantageously, each oblique sipe has a thickness, measured between the two walls that delimit it, at least equal to 0.2 mm. This minimum value corresponds to a technological minimum linked to the technology for manufacturing the sipe by moulding with the aid of a generally metallic mould sipe blade.

Also advantageously, each oblique sipe has a thickness, measured between the two walls that delimit it, at most equal to 1.2 mm Above this value, the coming into contact of the portions of material on either side of the sipe is no longer ensured, resulting in local deformations on either side of the sipe, bringing about an increase in the rate of wearing of the tread.

Advantageously, each oblique sipe has a depth, measured between the tread surface and a sipe bottom, at least equal to 2 mm Below 2 mm, the edge corner effect brought about by the sipe is insufficient to ensure effective grip, an edge corner being the intersection of a wall delimiting the sipe with the tread surface.

Also advantageously, each oblique sipe has a depth, measured between the tread surface and a cavity bottom, at most equal to the depth of the external cavity. Above this value, the portions of material delimited by the sipe become too flexible, and this may increase the risk of local chunking.

According to a preferred orientation, the first straight line, along which the length of the open section of each external cavity is measured, is parallel to a longitudinal direction of the tread and the second straight line, along which the width of the open section of each external cavity is measured, is parallel to a transverse direction of the tread. The longitudinal direction is the preferred direction of alignment of the external cavities, along their greatest dimension, since it corresponds to the running direction and therefore the preferred flow of the water.

In one preferred embodiment of the tread, the tread comprises at least two substantially longitudinal cuts, at least one of which is a complex cut comprising an alternation of external cavities, open onto the tread surface, and internal cavities, hidden in the tread thickness in the new state thereof and connected to the tread surface by a substantially longitudinal sipe, said respectively external and internal cavities being connected together so as to form a continuous channel. As shown above, the complex cuts provide a certain number of technical advantages as described, for example, in the documents WO 2011039194, WO 2011101495 and WO 2012130735.

The invention also relates to a tire for a heavy-duty vehicle, comprising a tread according to any one of the embodiments described above.

BRIEF DESCRIPTION OF THE DRAWINGS

The features of the invention are illustrated by the schematic FIGS. 1 to 8, which are not drawn to scale.

DETAILED DESCRIPTION OF THE DRAWINGS

Figure 1:
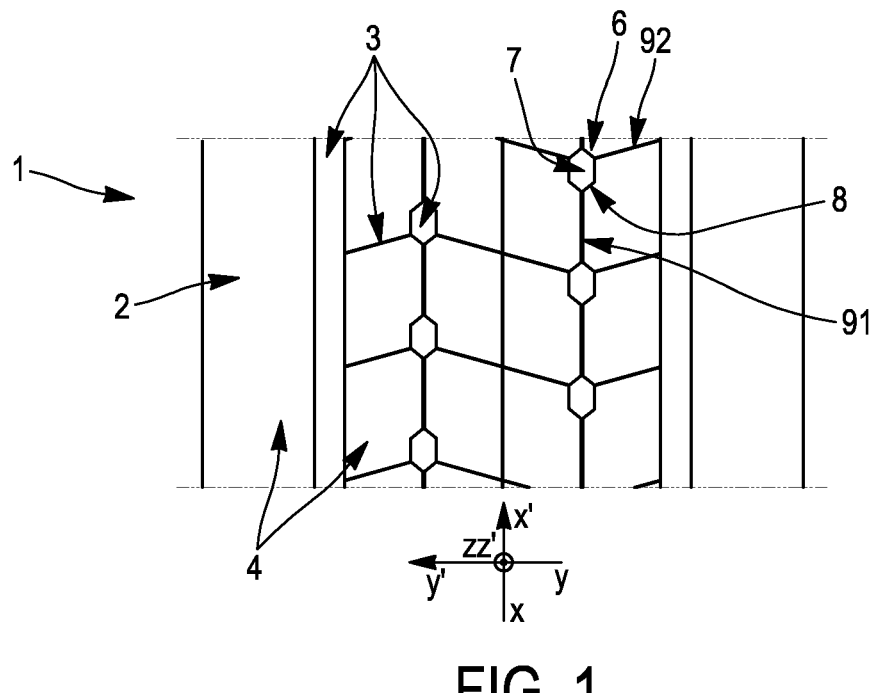
FIG. 1: Top view of a tread according to a first embodiment of the invention.

FIG. 1 is a top view of a tread according to a first embodiment of the invention. The tread 1, intended to come into contact with the ground via a tread surface 2, comprises cuts 3 and raised elements 4. Among the cuts 3, there are five longitudinal cuts, extending along a longitudinal direction XX', and cuts that are oblique with respect to the longitudinal direction XX'. Among the longitudinal cuts, there are:

in two lateral parts of the tread 1, two longitudinal grooves that are completely open onto the tread surface 2, in two intermediate parts of the tread 1, two complex longitudinal cuts, which are each made up of external cavities 6 of hexagonal shape that are connected together in pairs by longitudinal sipes 91, in the central part of the tread 1, a longitudinal sipe.

Oblique sipes 92 open into each external cavity 6 of a complex longitudinal cut. Every external cavity 6 is open onto the tread surface 2 along an open section 7 having a closed contour 8.

Figure 2:
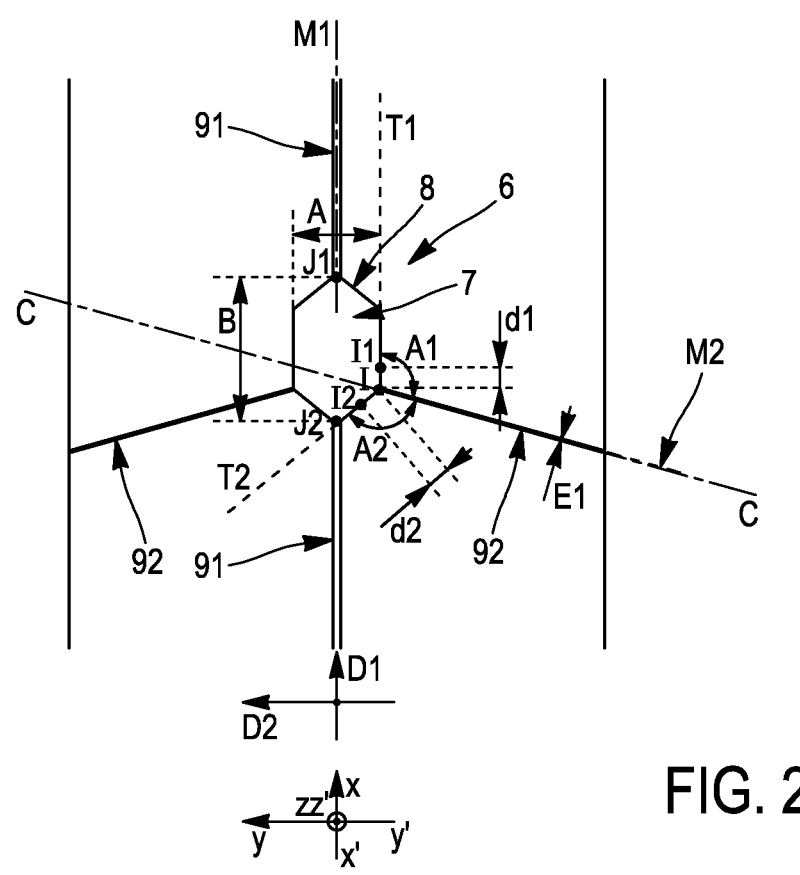
FIG. 2: Top view of a tread external cavity according to a first embodiment of the invention.

FIG. 2 is a top view of a tread external cavity according to the first embodiment of the invention, shown in FIG. 1. The external cavity 6 is connected to two longitudinal sipes 91, extending along the mean plot M1 of the longitudinal cut 3 and intersecting the contour 8 at two connection points J1 and J2. The mean plot M1 of a longitudinal sipe 91 is the straight line of intersection of its mean surface, which is flat in the case shown, with the tread surface 2. The open section 7 of the external cavity 6 has a length B, measured along a first straight line D1 passing through the two connection points J1 and J2, and a width A at most equal to the length B and measured along a second straight line D2 perpendicular to the first straight line D1. Two oblique sipes 92 open into the external cavity 6, each having, on the tread surface 2, a mean plot M2 that is not parallel to the first straight line D1 and intersects the contour 8 at a connection point I. The mean plot M2 of an oblique sipe 92 is the straight line of intersection of the mean plane thereof with the tread surface 2. According to the invention, the mean plot M2 of each oblique sipe 92 forms an angle (A1, A2) strictly greater than 90° with at at least two straight lines (T1, T2) tangential to the contour 8 respectively at two points (I1, I2) of the contour 8 that are positioned on either side of the mean plot M2 of the oblique sipe 92 and at a curvilinear distance (d1, d2) from the connection point I at most equal to 2 mm.

Figure 3:
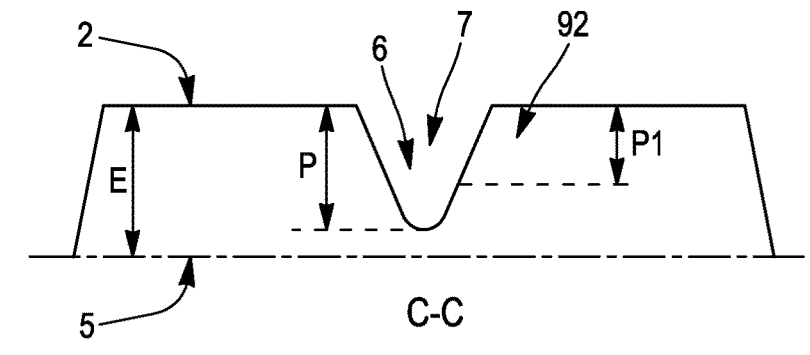
FIG. 3: View in partial section of a tread external cavity according to a first embodiment of the invention.

FIG. 3 is a view in partial section of a tread according to the first embodiment of the invention, shown in FIG. 1. The partial section C-C is taken on the mean plane of the oblique sipe 92 as shown in FIG. 2. The distance between the tread 2 and the bottom surface 5 defines the thickness E of the tread. By convention, the bottom surface 5 is a surface parallel to the tread surface 2 and tangential to the bottom of the deepest cut (not shown). The bottom surface delimits the maximum thickness of material to be worn down. The external cavity 6 opens onto the tread surface 2 along the open section 7 at a depth P. The oblique sipe 92 has a depth P1 less than the depth P of the external cavity, which is itself less than the thickness E of the tread.

Figure 4:
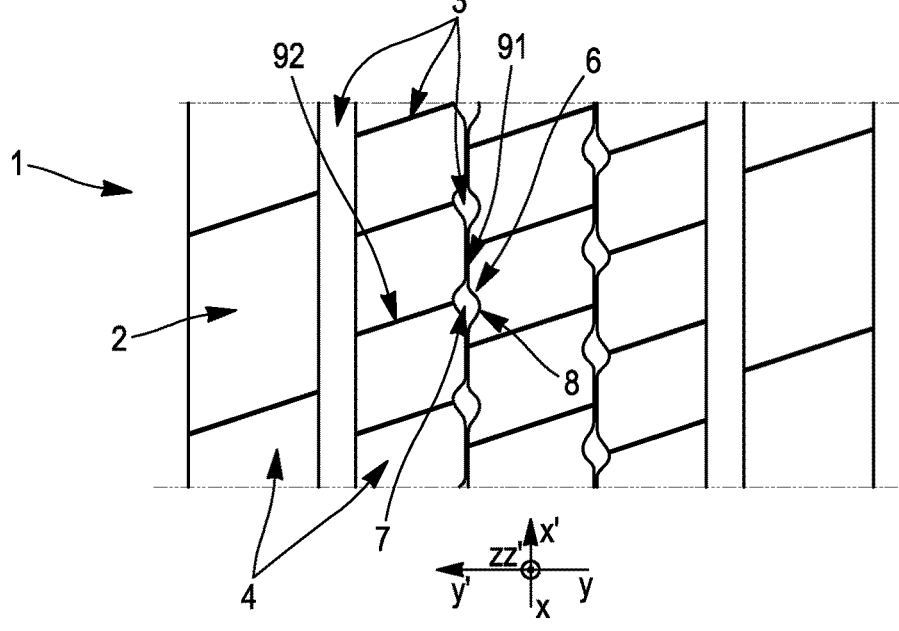
FIG. 4: Top view of a tread according to a second embodiment of the invention.

FIG. 4 is a top view of a tread according to a second embodiment of the invention. FIG. 4 differs primarily from FIG. 1 by the shape of the external cavities 6, which have curvilinear contours 7, and by the distribution of the oblique sipes 92 in the tread 1. Moreover, the lateral parts and the median part of the tread contain oblique sipes that do not open into the external cavities 6.

Figure 5:
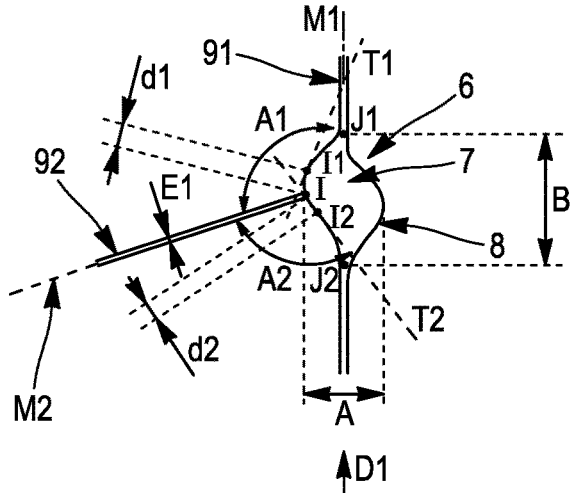
FIG. 5: Top view of a tread external cavity according to a second embodiment of the invention.

FIG. 5 is a top view of a tread external cavity according to the second embodiment of the invention, shown in FIG. 4. FIG. 5 differs primarily from FIG. 2 by the shape of the external cavity 6, which has a curvilinear contour 7.

Figure 6:
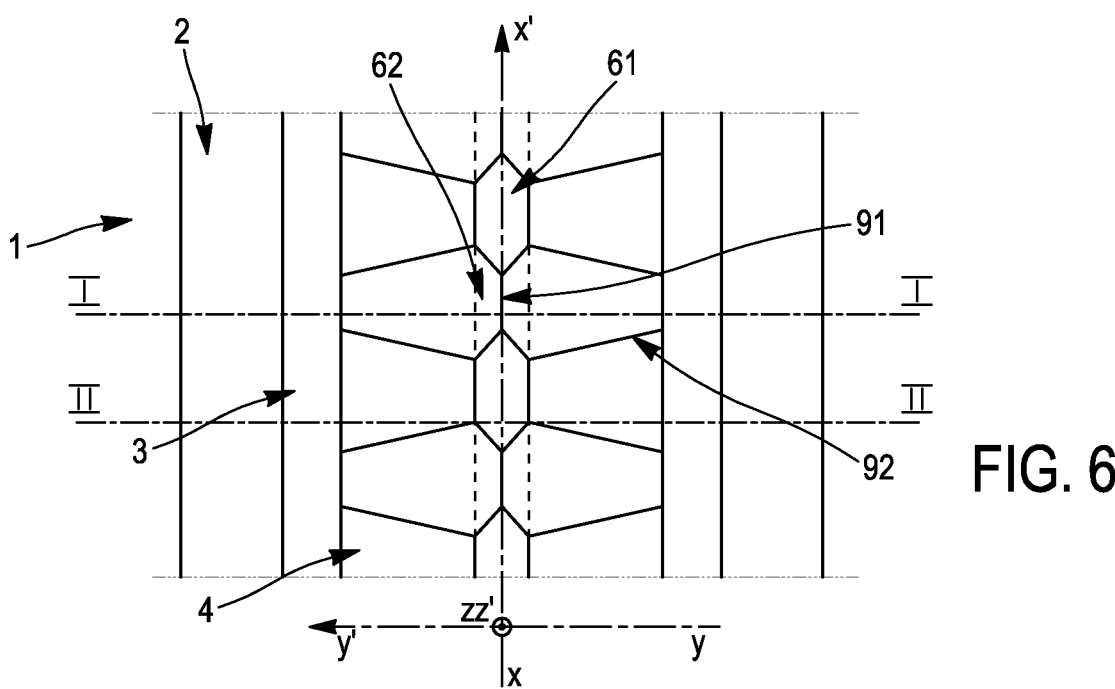
FIG. 6: Top view of a tread according to a third embodiment of the invention, comprising a complex longitudinal cut.

FIG. 6 is a top view of a tread according to a third embodiment of the invention, comprising a complex longitudinal cut in its central part. The tread 1 comprises three longitudinal cuts 3, including two completely open longitudinal grooves, which are positioned in the lateral parts, and a complex longitudinal cut, which is positioned in the median plane XZ of the tread dividing the latter into two equal parts. The complex longitudinal cut comprises an alternation of external cavities 61, open onto the tread surface 2, and internal cavities 62, hidden in the thickness E of the tread in the new state thereof, said respectively external 61 and internal 62 cavities being connected together so as to form a continuous channel, depicted by way of dashed lines. Longitudinal sipes 61, along the longitudinal direction XX' of the tread, open into the external cavities 61. Oblique sipes 92, with respect to the longitudinal direction XX' of the tread, open into the external cavities 61 along orientations according to the invention.

Figure 7:
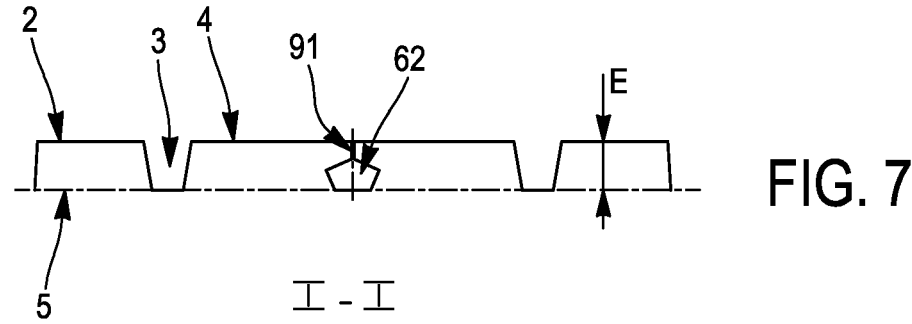
FIG. 7: View in transverse section, at an internal cavity, of a tread according to a third embodiment of the invention, comprising a complex longitudinal cut.

FIG. 7 is a view in transverse section, at an internal cavity, of a tread according to the third embodiment of the invention, shown in FIG. 6. The transverse section is taken on the transverse plane I-I, perpendicular to the longitudinal direction XX', in FIG. 6. This section shows in particular an internal cavity 62, hidden in the tread thickness E in the new state thereof and positioned in the median plane of the tread, between the two longitudinal grooves 3 separating the raised elements 4 with respect to the bottom surface and connected to the tread surface 2 by a longitudinal sipe 91.

Figure 8:
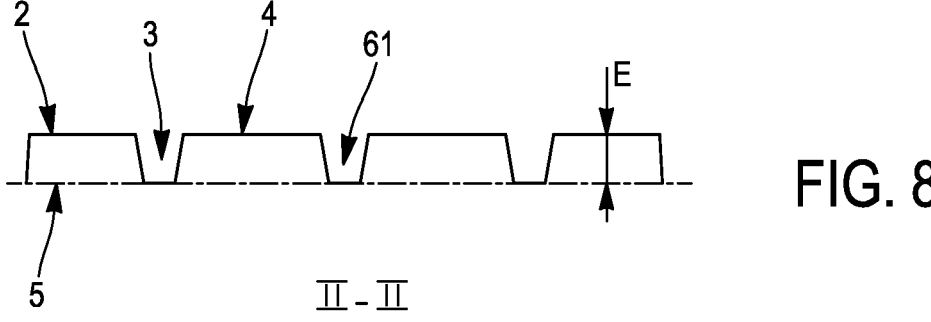
FIG. 8: View in transverse section, at an external cavity, of a tread according to a third embodiment of the invention, comprising a complex longitudinal cut.

FIG. 8 is a view in transverse section, at an external cavity, of a tread according to the third embodiment of the invention, shown in FIG. 6. The transverse section is taken on the transverse plane II-II, perpendicular to the longitudinal direction XX', in FIG. 6. This section shows in particular an external cavity 61, open onto the tread surface 2 and positioned in the median plane of the tread, between the two longitudinal grooves 3 separating the raised elements 4 with respect to the bottom surface 5.

The inventors studied this invention more particularly in the case of a heavy-duty vehicle tire of the size 355/50 R 22.5, the tread of which comprises hexagonal external cavities as shown in FIGS. 1 and 2.

Table 1 below shows the characteristics of the tread that was tested:

TABLE 1

| Characteristics | Values |
| --- | --- |
| Thickness E of tread 1 | 14 mm |
| Width A of external cavity 6 | 13.5 mm |
| Length B of external cavity 6 | 23.3 mm |
| Depth P of external cavity 6 | 14 mm |
| Thickness E1 of the oblique sipe 92 | 0.8 mm |
| Depth P1 of the oblique sipe 92 | 2.5 mm |
| First angle A1 of the oblique sipe 92 | 105° |
| Second angle A2 of the oblique sipe 92 | 125° |

The invention was tested for a tire of the size 355/50 R 22.5, intended to bear a load equal to 4000 kg, for an inflation pressure equal to 9 bar, according to the "Standards Manual 2020" of the ETRTO standard.

During running tests carried out on vehicles of user clients, the inventors observed the chunking undergone by a tread comprising both a first set of open oblique sipes, according to the invention, with obtuse angles, and a second set of open oblique sipes, not according to the invention, with acute angles. They found that the crack initiations at the junction zones of the oblique sipes with the external cavities affected primarily the second set of open oblique sipes, not according to the invention, but not the first set of open oblique sipes, according to the invention. Consequently, they were therefore able to infer an improvement in the resistance to chunking of the oblique sipes opening into external cavities, thanks to the choice of an optimized orientation of these sipes.

The tread according to the invention, which was developed for a conventional tire subjected to inflation pressure, may also be used for a non-pneumatic tire, but also for any non-pneumatic rolling assembly with which a vehicle is intended to be equipped.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A heavy duty vehicle tire tread intended to come into contact with the ground via a tread surface, comprising:
cuts delimiting raised elements, and having a thickness (E), along a radial direction (ZZ'), between the tread surface and a bottom surface,
the tread comprising:
at least one substantially longitudinal cut having, on the tread surface, a mean plot (M1), the tangent of which at any point forms an angle at most equal to 45° with a longitudinal direction (XX') of the tread (1),
the at least one substantially longitudinal cut comprising at least one external cavity open onto the tread surface along an open section having a closed contour,
each external cavity being connected to two substantially longitudinal sipes, extending along the mean plot (M1) of the substantially longitudinal cut and intersecting the contour at two connection points (J1, J2),
the open section of each external cavity having a length (B), measured along a first straight line (D1) passing through the two connection points (J1, J2), and a width (A) at most equal to the length (B) and measured along a second straight line (D2) perpendicular to the first straight line (D1),
at least one oblique sipe opening into each axial side of each external cavity at a respective connection point, and having, on the tread surface, a mean plot (M2) that is not parallel to the first straight line (D1) and intersects the contour at a connection point (I), each connection point defined by a pair of walls of each external cavity that extend in different axial and/or circumferential directions,
wherein the mean plot (M2) of each oblique sipe forms an angle (A1, A2) strictly greater than 90° with at least two straight lines (T1, T2) tangential to the contour respectively at two points (I1, I2) of the contour that are positioned on either side of the mean plot (M2) of the oblique sipe and at a curvilinear distance (d1, d2) from the connection point (I) at most equal to 2 mm,
wherein sipes have a width such that facing walls of material that delimit them come into contact with one another at least partially when the tread enters the contact patch, and
wherein the at least one oblique sipe opening into each axial side of each external cavity are symmetrically arranged with respect to the mean plot (M1) of the substantially longitudinal cut.

2. The tread according to claim 1, wherein the mean plot (M2) of each oblique sipe forms an angle (A1, A2) strictly greater than 90° with any straight line (T1, T2) tangential to the contour at any point (I1, I2) on the contour that is positioned at a curvilinear distance (d1, d2) from the connection point (I) at most equal to 2 mm.

3. The tread according to claim 1, wherein the width (A) of the open section of each external cavity is at least equal to 4 mm.

4. The tread according to claim 1, wherein the width (A) of the open section of each external cavity is at most equal to 17 mm.

5. The tread according to claim 1, wherein the length (B) of the open section of each external cavity is at most equal to 10 times the width (A) of said open section.

6. The tread according to claim 1, wherein each external cavity has a depth (P), measured between the tread surface and a cavity bottom, at least equal to 0.25 times the thickness (E) of the tread.

7. The tread according to claim 1, wherein each external cavity has a depth (P), measured between the tread surface and a cavity bottom, at most equal to the thickness (E) of the tread.

8. The tread according to claim 1, wherein each oblique sipe has a thickness (E1), measured between the two walls that delimit it, at least equal to 0.2 mm.

9. The tread according to claim 1, wherein each oblique sipe has a thickness (E1), measured between the two walls that delimit it, at most equal to 1.2 mm.

10. The tread according to claim 1, wherein each oblique sipe has a depth (P1), measured between the tread surface and a cavity bottom, at least equal to 2 mm.

11. The tread according to claim 1, wherein each oblique sipe has a depth (P1), measured between the tread surface and a cavity bottom, at most equal to the depth (P) of the external cavity.

12. The tread according to claim 1, wherein the first straight line (D1), along which the length (B) of the open section of each external cavity is measured, is parallel to a longitudinal direction (XX') of the tread and the second straight line (D2), along which the width (A) of the open section of each external cavity is measured, is parallel to a transverse direction (YY') of the tread.

13. The tread according to claim 1, comprising at least two substantially longitudinal cuts, at least one of which is a complex cut comprising an alternation of external cavities, open onto the tread surface, and internal cavities, hidden in the tread thickness (E) in the new state thereof and connected to the tread surface by a substantially longitudinal sipe, said respectively external and internal cavities being connected together so as to form a continuous channel.

14. A tire for a heavy-duty vehicle, comprising a tread according to claim 1.

* * * * *